(12) United States Patent
Fukui et al.

(10) Patent No.: US 7,693,298 B2
(45) Date of Patent: Apr. 6, 2010

(54) IMAGE PROCESSING SYSTEM HAVING A PLURALITY OF USERS UTILIZING A PLURALITY OF IMAGE PROCESSING APPARATUSES CONNECTED TO NETWORK, IMAGE PROCESSING APPARATUS, AND IMAGE PROCESSING PROGRAM PRODUCT EXECUTED BY IMAGE PROCESSING APPARATUS

(75) Inventors: Kazuyuki Fukui, Toyohashi (JP); Mikio Masui, Kobe (JP); Hiroyuki Ozawa, Kawasaki (JP); Shuichiro Kaneko, Yokohama (JP); Norihisa Takayama, Kobe (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1110 days.

(21) Appl. No.: 11/254,737

(22) Filed: Oct. 21, 2005

(65) Prior Publication Data
US 2006/0274358 A1 Dec. 7, 2006

(30) Foreign Application Priority Data
Jun. 1, 2005 (JP) ............................ 2005-161000

(51) Int. Cl.
*G06K 9/00* (2006.01)

(52) U.S. Cl. ..................................... 382/100
(58) Field of Classification Search ................. 382/100, 382/101, 112; 358/1.1, 1.4, 500, 501, 400–408, 358/305, 1.15; 709/227–246; 348/61
See application file for complete search history.

(56) References Cited

U.S. PATENT DOCUMENTS 5,768,483 A * 6/1998 Maniwa et al. ............. 358/1.15

(Continued)

FOREIGN PATENT DOCUMENTS

EP 0 929 023 A1 7/1999

(Continued)

OTHER PUBLICATIONS

Notification of Grounds of Rejection in JP 2005-161000 dated Feb. 26, 2008, and Translation thereof.

(Continued)

*Primary Examiner*—Samir A. Ahmed
*Assistant Examiner*—Atiba O Fitzpatrick
(74) *Attorney, Agent, or Firm*—Buchanan Ingersoll & Rooney PC

(57) ABSTRACT

An image processing system includes a plurality of MFPs (Multi Function Peripheral) connected to a network, and each of the plurality of MFPs is provided with an HDD (Hard Disk Drive) to store registered user information associating user identification information for identifying a user and personal information related to that user, and when the user identification information is inputted, it determines whether the personal information associated with the user identification information is stored in the HDD or not, and if the personal information is stored, the personal information is read from the HDD, and if the personal information is not stored, it transmits a personal information transmission request including the user identification information to another MFP, and receives the personal information from the MFP that stores the registered user information including the user identification information, and controls a prescribed apparatus operation based on the read or received personal information.

15 Claims, 14 Drawing Sheets

U.S. PATENT DOCUMENTS

| | | | |
|---|---|---|---|
| 6,202,092 B1 * | 3/2001 | Takimoto | 709/225 |
| 6,246,487 B1 | 6/2001 | Kobayashi et al. | |
| 2004/0201872 A1 | 10/2004 | Horaguchi et al. | |
| 2006/0001907 A1 | 1/2006 | Kumagai | |

FOREIGN PATENT DOCUMENTS

| | | |
|---|---|---|
| EP | 1 120 701 A1 | 8/2001 |
| JP | 6-62146 | 3/1994 |
| JP | 06-245000 | 9/1994 |
| JP | 09-305318 | 11/1997 |
| JP | 10-42114 | 2/1998 |
| JP | 10-079817 | 3/1998 |
| JP | 10-093803 | 4/1998 |
| JP | 11-184777 | 7/1999 |
| JP | 2001-103232 | 4/2001 |
| JP | 2001-249929 | 9/2001 |
| JP | 2001-306204 | 11/2001 |
| JP | 2004-15629 | 1/2004 |
| JP | 2004-185423 | 7/2004 |
| JP | 2004-215179 | 7/2004 |
| JP | 2005-20223 | 1/2005 |
| WO | 02/41133 A2 | 5/2002 |

OTHER PUBLICATIONS

European Search Report dated Aug. 16, 2006.

* cited by examiner

Fig. 4A

REGISTERED USER INFORMATION OF MFP 100

| NUMBER | USER IDENTIFICATION INFORMATION | PERSONAL INFORMATION | | | |
|---|---|---|---|---|---|
| | | ACCOMPANYING INFORMATION A | ADDRESS BOOK A | PANEL SETTING INFORMATION A | AUTHENTICATION INFORMATION A | HISTORY INFORMATION A |
| 1 | DAVID | | | | | |

Fig. 4B

REGISTERED USER INFORMATION OF MFP 100A

| NUMBER | USER IDENTIFICATION INFORMATION | PERSONAL INFORMATION | | | |
|---|---|---|---|---|---|
| | | ACCOMPANYING INFORMATION B | ADDRESS BOOK B | PANEL SETTING INFORMATION B | AUTHENTICATION INFORMATION B | HISTORY INFORMATION B |
| 2 | JULIE | | | | | |

Fig. 4C

REGISTERED USER INFORMATION OF MFP 100B

| NUMBER | USER IDENTIFICATION INFORMATION | PERSONAL INFORMATION | | | |
|---|---|---|---|---|---|
| | | ACCOMPANYING INFORMATION C | ADDRESS BOOK C | PANEL SETTING INFORMATION C | AUTHENTICATION INFORMATION C | HISTORY INFORMATION C |
| 3 | TED | | | | | |

Fig. 4D

REGISTERED USER INFORMATION OF MFP 100C

| NUMBER | USER IDENTIFICATION INFORMATION | PERSONAL INFORMATION | | | |
|---|---|---|---|---|---|
| | | ACCOMPANYING INFORMATION | ADDRESS BOOK | PANEL SETTING INFORMATION | AUTHENTICATION INFORMATION | HISTORY INFORMATION |
| 4 | MICHAEL | ACCOMPANYING INFORMATION D | ADDRESS BOOK D | PANEL SETTING INFORMATION D | AUTHENTICATION INFORMATION D | HISTORY INFORMATION D |
| 5 | SUSAN | ACCOMPANYING INFORMATION E | ADDRESS BOOK E | PANEL SETTING INFORMATION E | AUTHENTICATION INFORMATION E | HISTORY INFORMATION E |

Fig. 4E

USER DATA

| NUMBER | USER IDENTIFICATION INFORMATION | HOME TERMINAL |
|---|---|---|
| 1 | DAVID | IP ADDRESS OF MFP 100 |
| 2 | JULIE | IP ADDRESS OF MFP 100A |
| 3 | TED | IP ADDRESS OF MFP 100B |
| 4 | MICHAEL | IP ADDRESS OF MFP 100C |
| 5 | SUSAN | IP ADDRESS OF MFP 100C |

Fig. 7

USER DATA

| NUMBER | USER IDENTIFICATION INFORMATION | PERSONAL INFORMATION | | | | | | HOME TERMINAL |
|---|---|---|---|---|---|---|---|---|
| | | ACCOMPANYING INFORMATION | ADDRESS BOOK | PANEL SETTING INFORMATION | AUTHENTICATION INFORMATION | HISTORY INFORMATION | | |
| 1 | DAVID | ACCOMPANYING INFORMATION A | ADDRESS BOOK A | PANEL SETTING INFORMATION A | AUTHENTICATION INFORMATION A | HISTORY INFORMATION A | | IP ADDRESS OF MFP 100 |
| 2 | JULIE | ACCOMPANYING INFORMATION B | ADDRESS BOOK B | PANEL SETTING INFORMATION B | AUTHENTICATION INFORMATION B | HISTORY INFORMATION B | | IP ADDRESS OF MFP 100A |
| 3 | TED | ACCOMPANYING INFORMATION C | ADDRESS BOOK C | PANEL SETTING INFORMATION C | AUTHENTICATION INFORMATION C | HISTORY INFORMATION C | | IP ADDRESS OF MFP 100B |
| 4 | MICHAEL | ACCOMPANYING INFORMATION D | ADDRESS BOOK D | PANEL SETTING INFORMATION D | AUTHENTICATION INFORMATION D | HISTORY INFORMATION D | | IP ADDRESS OF MFP 100C |
| 5 | SUSAN | ACCOMPANYING INFORMATION E | ADDRESS BOOK E | PANEL SETTING INFORMATION E | AUTHENTICATION INFORMATION E | HISTORY INFORMATION E | | IP ADDRESS OF MFP 100C |

IMAGE PROCESSING SYSTEM HAVING A PLURALITY OF USERS UTILIZING A PLURALITY OF IMAGE PROCESSING APPARATUSES CONNECTED TO NETWORK, IMAGE PROCESSING APPARATUS, AND IMAGE PROCESSING PROGRAM PRODUCT EXECUTED BY IMAGE PROCESSING APPARATUS

This application is based on Japanese Patent Application No. 2005-161000 filed with Japan Patent Office on Jun. 1, 2005, the entire content of which is hereby incorporated by reference.

BACKGROUND OF THE INVENTION

1. Field of the Invention

The present invention relates to an image processing system, an image processing apparatus, and an image processing program product, and more specifically to an image processing system in which a plurality of users utilize a plurality of image processing apparatuses connected to a network, an image processing apparatus, and an image processing program product executed by the image processing apparatus.

2. Description of the Related Art

In recent years, an image processing apparatus such as a scanner, a printer, or a facsimile is commonly used in the form of being connected to a network. In such form of use, a technology in which the same specification is used for the operation panels in all of the image processing apparatuses where a plurality of image processing apparatuses are used is described in Japanese Patent Laying-Open No. 2001-306204. According to the technology described in Japanese Patent Laying-Open No. 2001-306204, when a user inputs user identification information such as a password using an operation panel, the user identification information is transmitted from an image processing apparatus to a file server via a network. A user authentication portion within the file server performs a matching of the transmitted user identification information and the user identification information registered in advance, and when the user authentication is completed, the file server reads a shared setting file corresponding to the user and provides it via the network to the image processing apparatus which requested it. Thereafter, the specification of the operation panel is customized according to the descriptive content of the shared setting file.

According to the technology described in Japanese Patent Laying-Open No. 2001-306204, however, a file server must be provided, and the shared setting file must be stored in the server. Thus, in such a case as where an image processing apparatus is connected anew to the network, such setting is required as storing in the newly connected image processing apparatus a network address of the file server required for accessing the file server. As a result, there was a problem that system modifications could not be accommodated with flexibility.

SUMMARY OF THE INVENTION

The present invention is made to solve the above-described problem, and an object of the present invention is to provide an image processing system that allows the customization performed for one of a plurality of image processing apparatuses connected to a network to be reflected on another image processing apparatus connected to the network, without the use of a server.

Another object of the present invention is to provide an image processing apparatus and an image processing program product that can reflect the customization performed for another image processing apparatus connected to the network, without the use of a server.

To achieve the above-described objects, according to one aspect of the present invention, an image processing system includes a plurality of image processing apparatuses each connected to a network, wherein each of the plurality of image processing apparatuses includes a storage portion to store registered user information which associates user identification information for identifying a user with personal information related to the user, an input portion into which the user identification information is inputted, a determination portion to determine in response to the user identification information being inputted into the input portion whether the personal information associated with the user identification information inputted is stored in the storage portion or not, a read portion to read from the storage portion the personal information associated with the user identification information inputted if the determination portion determines that the personal information is stored, a personal information obtaining portion to transmit to another image processing apparatus a personal information transmission request including the user identification information inputted into the input portion and to receive the personal information associated with the user identification information from the image processing apparatus which stores registered user information including the user identification information if the determination portion determines that the personal information is not stored, and a control portion to control a prescribed apparatus operation based on the personal information read by the read portion or the personal information received by the personal information obtaining portion.

According to the present invention, by storing personal information in one of a plurality of image processing apparatuses connected to the network, the operation of an image processing apparatus which does not store that personal information can be controlled based on that personal information. As a result, an image processing system that allows the customization performed for one of a plurality of image processing apparatuses connected to a network to be reflected on another image processing apparatus connected to the network can be provided without the use of a server.

According to another aspect of the present invention, an image processing system includes a plurality of image processing apparatuses each connected to a network, wherein each of the plurality of image processing apparatuses includes a storage portion to store registered user information which associates user identification information for identifying a user with personal information unique to the user, a user identification information transmission request portion to request at least one other image processing apparatus to transmit user identification information stored in the storage portion provided in the at least one other image processing apparatus, a user identification information reception portion to receive the user identification information transmitted by the at least one other image processing apparatus according to a user identification information transmission request made by the user identification information transmission request portion, a user data storage portion to store user data which associates the user identification information received by the user identification information reception portion with apparatus identification information for identifying an image processing apparatus that stored the user identification information, an input portion into which the user identification information is inputted, a personal information obtaining portion to obtain, from an image processing apparatus determined by the user identification information and the user data, personal information associated with the user identification information inputted, in response to the user identification information being inputted into the input portion, and a control portion to control a prescribed apparatus operation based on the personal information obtained by the personal information obtaining portion.

According to the present invention, user data is stored which associates user identification information with apparatus identification information for identifying an image processing apparatus in which the user identification information was stored. Then, when the user identification information is inputted, personal information associated with the user identification information is obtained from the image processing apparatus determined by the user identification information and the user data, and a prescribed apparatus operation is controlled based on the personal information obtained. Thus, by storing the personal information in another image processing apparatus connected to the network, the operation can be controlled based on that personal information. In addition, since the user data is stored, the image processing apparatus which stores the personal information related to user identification information can be easily specified from the user identification information. As a result, an image processing system that allows the customization performed for one of a plurality of image processing apparatuses connected to a network to be reflected on another image processing apparatus connected to the network can be provided without the use of a server.

According to a further aspect of the present invention, an image processing apparatus connected to a network and being capable of communicating with at least one other image processing apparatus connected to the network includes a storage portion to store registered user information which associates user identification information for identifying a user with personal information related to the user, an input portion into which the user identification information is inputted, a determination portion to determine in response to the user identification information being inputted into the input portion whether the personal information associated with the user identification information inputted is stored in the storage portion or not, a read portion to read from the storage portion the personal information associated with the inputted user identification information if the determination portion determines that the personal information is stored, a personal information obtaining portion to transmit to the at least one other image processing apparatus a personal information transmission request including the user identification information inputted into the input portion and to receive the personal information associated with the user identification information from the at least one other image processing apparatus if the determination portion determines that the personal information is not stored, and a control portion to control a prescribed apparatus operation based on the personal information read by the read portion or the personal information received by the personal information obtaining portion.

According to the present invention, an image processing apparatus that can reflect the customization performed for another image processing apparatus connected to the network can be provided without the use of a server.

According to a still further aspect of the present invention, an image processing apparatus connected to a network and being capable of communicating with at least one other image processing apparatus connected to the network includes a storage portion to store registered user information which associates user identification information for identifying a user with personal information related to the user, a user identification information transmission request portion to request the at least one other image processing apparatus to transmit user identification information stored in the at least one other image processing apparatus, a user identification information reception portion to receive the user identification information transmitted by the at least one other image processing apparatus according to a user identification information transmission request made by the user identification information transmission request portion, a user data storage portion to store user data which associates the user identification information received by the user identification information reception portion with apparatus identification information for identifying an image processing apparatus that stored the user identification information, an input portion into which the user identification information is inputted, a personal information obtaining portion to obtain, from an image processing apparatus determined by the user identification information and the user data, personal information associated with the user identification information inputted, in response to the user identification information being inputted into the input portion, and a control portion to control a prescribed apparatus operation based on the personal information obtained by the personal information obtaining portion.

According to the present invention, an image processing apparatus that can reflect the customization performed for another image processing apparatus connected to the network can be provided without the use of a server.

According to a still further aspect of the present invention, an image processing program product stores an image processing program executed by an image processing apparatus which is connected to a network and which is capable of communicating with at least one other image processing apparatus connected to the network, wherein the image processing apparatus includes a storage portion to store registered user information which associates user identification information for identifying a user with personal information related to the user, and the image processing program includes the steps of accepting an input of user identification information, determining in response to the user identification information being inputted in the accepting step whether the personal information associated with the user identification information inputted is stored in the storage portion or not, reading from the storage portion the personal information associated with the inputted user identification information if it is determined in the determining step that the personal information is stored, transmitting to the at least one other image processing apparatus a personal information transmission request including the user identification information accepted in the accepting step and receiving the personal information associated with the user identification information from the at least one other image processing apparatus if it is determined in the determining step that the personal information is not stored, and controlling a prescribed apparatus operation based on the personal information read in the reading step or the personal information received in the receiving step.

According to the present invention, an image processing program product that can reflect the customization performed for another image processing apparatus connected to the network can be provided without the use of a server.

According to a still further aspect of the present invention, an image processing program product stores an image processing program executed by an image processing apparatus which is connected to a network and which is capable of communicating with at least one other image processing apparatus connected to the network, wherein the image processing apparatus includes a storage portion to store registered user information which associates user identification information for identifying a user with personal information related to the user, and the image processing program including the steps of requesting the at least one other image processing apparatus to transmit user identification information stored in the at least one other image processing apparatus, receiving the user identification information transmitted by the at least one other image processing apparatus according to a user identification information transmission request made in the requesting step, storing user data which associates the user identification information received in the receiving step with apparatus identification information for identifying an image processing apparatus that stored the user identification information, accepting an input of the user identification information, obtaining, from an image processing apparatus determined by the user identification information and the user data, personal information associated with the user identification information inputted, in response to the user identification information being inputted in the accepting step, and controlling a prescribed apparatus operation based on the personal information obtained.

According to the present invention, an image processing program product that can reflect the customization performed for another image processing apparatus connected to the network can be provided without the use of a server.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4E are diagrams for describing registered user information and user data.

FIG. 7 is a diagram showing an example of user data generated in each image processing apparatus of an image processing system according to a modification.

DESCRIPTION OF THE PREFERRED EMBODIMENTS

Figure 1:
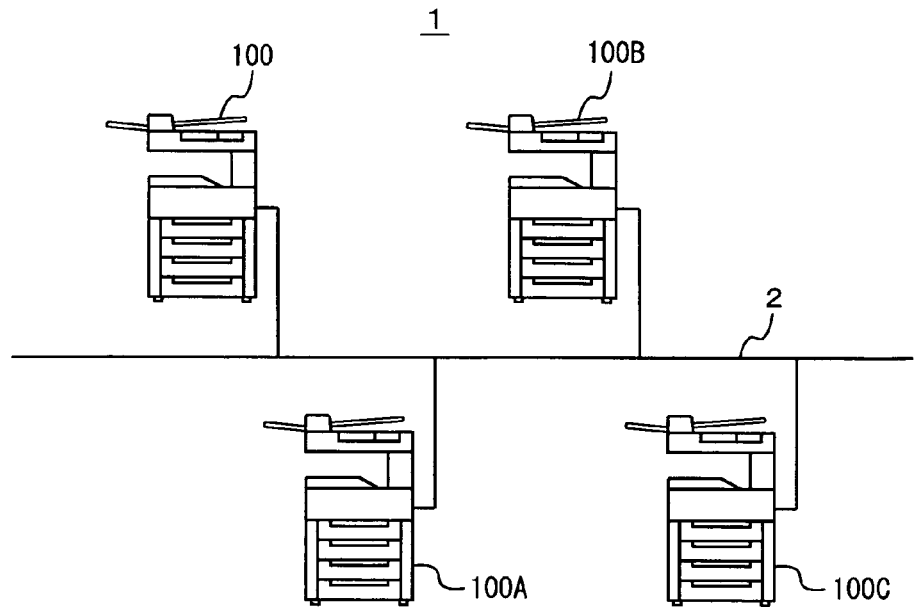
FIG. 1 is an overall schematic diagram of an image processing system according to a first embodiment of the present invention.

The embodiments of the present invention will be described below with reference to the drawings. In the following description, the same or corresponding parts are denoted by the same reference characters. Their names and function are also the same. Thus, a detailed description thereof will not be repeated.

First Embodiment

FIG. 1 is an overall schematic diagram showing an image processing system according to the first embodiment of the present invention. With reference to FIG. 1, an image processing system 1 includes multi function peripherals (referred to as "MFP" below) 100, 100A, 100B, and 100C, each connected to a network 2. The arrangement and the function of MFP 100, 100A, 100B, and 100C are the same so that MFP 100 will be described here as an example unless otherwise noted.

MFP (Multi Function Peripheral) 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in the this embodiment, MFP 100 can be replaced by an apparatus having a function for processing an image, for instance, a scanner, a printer, a facsimile, a personal computer for generating image data, and the like.

Network 2 is a local area network (LAN) and the form of connection can be fixed-line or wireless. In addition, network 2 is not limited to a LAN and can be a wide area network (WAN) such as the Internet, a network using general public lines, and so on.

Figure 2:
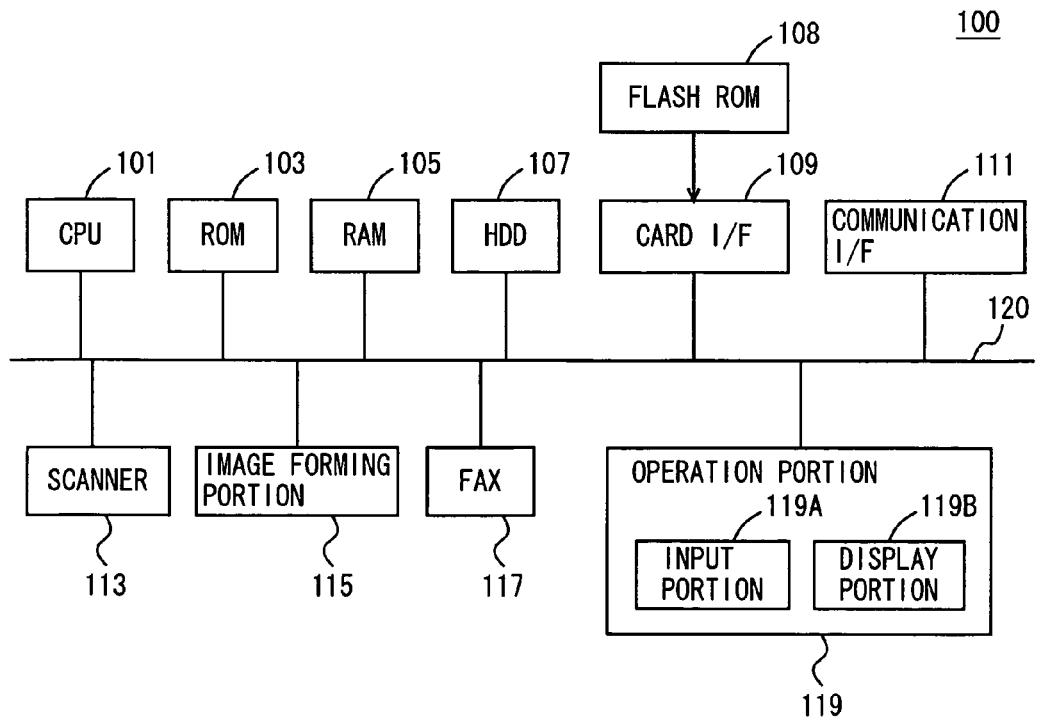
FIG. 2 is a block diagram showing a hardware arrangement of an MFP.

FIG. 2 is a block diagram showing a hardware arrangement of MFP 100. With reference to FIG. 2, MFP 100 includes, respectively connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting MFP 100 to network 2, a scanner 113, an image forming portion 115, a facsimile (FAX) 117, and an operation portion 119 as an interface with a user.

CPU 101 loads into RAM 105 and executes an image processing program stored in flash ROM 108 attached to card I/F 109. Moreover, the program executed by CPU 101 is not limited to the image processing program stored in flash ROM 108, and a program stored in an EEPROM (Electrically Erasable/Programmable Read Only Memory) connected additionally to CPU 101 can be loaded into RAM 105 and be executed. The use of an EEPROM makes it possible to rewrite or additionally write an image processing program. Thus, a computer connected to network 2 can rewrite the image processing program stored in the EEPROM of MFP 100 or additionally write a new image processing program into the EEPROM. Furthermore, MFP 100 can download an image processing program from a computer connected to network 2 and store the image processing program in an EEPROM.

The program referred to here not only includes a program directly executable by CPU 101, but also a program in a source program format, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile standard via a public telephone line.

Operation portion 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided overlapping display portion 119B so that an instruction of a button displayed on display portion 119B can be detected. Thus, input of a variety of operations becomes possible.

Communication I/F 111 is a communication interface for connecting MFP 100 to network 2. Thus, it becomes possible for MFP 100 to communicate with other MFPs 100A, 100B, and 100C. Although MFP 100 is connected to other MFPs 100A, 100B, and 100C via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is inputted; (2) when image data is received from a computer or from other MFPs 100A, 100B, and 100C connected to network 2 via communication I/F 111; (3) when image data store in flash ROM 108 is read via card I/F 109; and (4) when facsimile data is received in FAX 117. The data inputted into MFP 100 is given a file name and is temporarily stored in a prescribed area of HDD 107.

The output of data from MFP 100 includes the following cases: when the data stored in HDD 107 is (1) made visible on recording media such as a sheet of paper by image forming portion 115, (2) transmitted to a computer or to other MFPs 100A, 100B, and 100C connected to network 2 via communication I/F 111, (3) stored in flash ROM 108, (4) outputted as facsimile data by FAX 117, and (5) displayed on display portion 119B.

Moreover, storage media that stores an image processing program is not limited to flash ROM 108 and can also be the media that records a program in a fixed manner, such as a flexible disk, a cassette tape, an optical disk [MO (Magnetic Optical Disc)/MD (Mini Disc)/DVD (Digital Versatile Disc)], an IC card (including a memory card), an optical card, and a semiconductor memory such as a masked ROM, an EPROM, an EEPROM, and the like.

In the image processing system according to this embodiment, with each of MFPs 100, 100A, 100B, and 100C, a user who mainly uses the apparatus is fixed. Thus, each of MFPs 100, 100A, 100B, and 100C stores registered user information in order to register the user who mainly uses it. The registered user information, which will be described later, includes at least user identification information for identifying a user. The name of the user can be used as the user identification information. Here, based on the user, any one or more of MFPs 100, 100A, 100B, and 100C which store the registered user information of that user are referred to as "home terminals." For instance, if the registered user information of the user "David" is stored in MFP 100, a home terminal of the user "David" is MFP 100. Moreover, registered user information is stored in each of MFPs 100, 100A, 100B, and 100C to define a user who mainly uses the apparatus but not to prohibit the user whose registered user information is not stored therein from using it.

Here, the case in which MFP 100 is connected anew to network 2 where MFPs 100A, 100B, and 100C are already connected thereto is considered. For MFP 100, it is necessary to set apparatus identification information for identifying MFP 100 and the above-described registered user information. When the apparatus identification information and the registered user information are set for MFP 100, MFP 100 transmits the apparatus identification information and the registered user information to other MFPs 100A, 100B, and 100C. Thus, an image processing system is constructed among MFPs 100, 100A, 100B, and 100C.

Figure 3A:
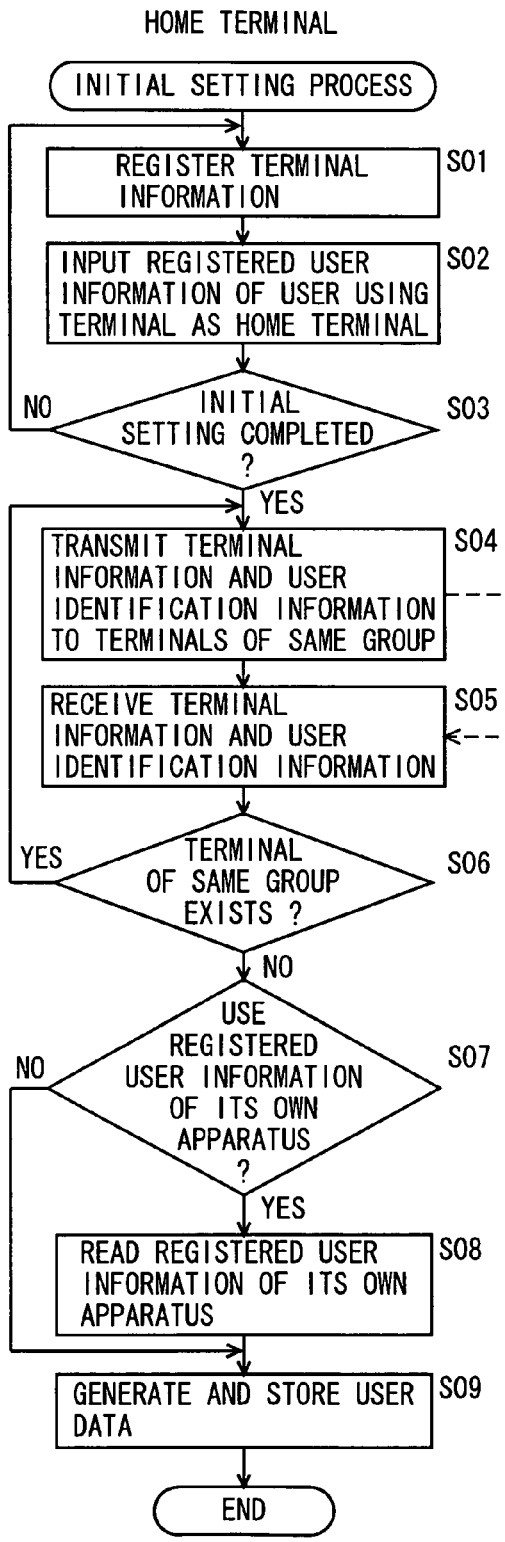
FIGS. 3A and 3B are flow charts showing a flow of a process executed when the MFP is newly connected to a network.
Figure 3B:
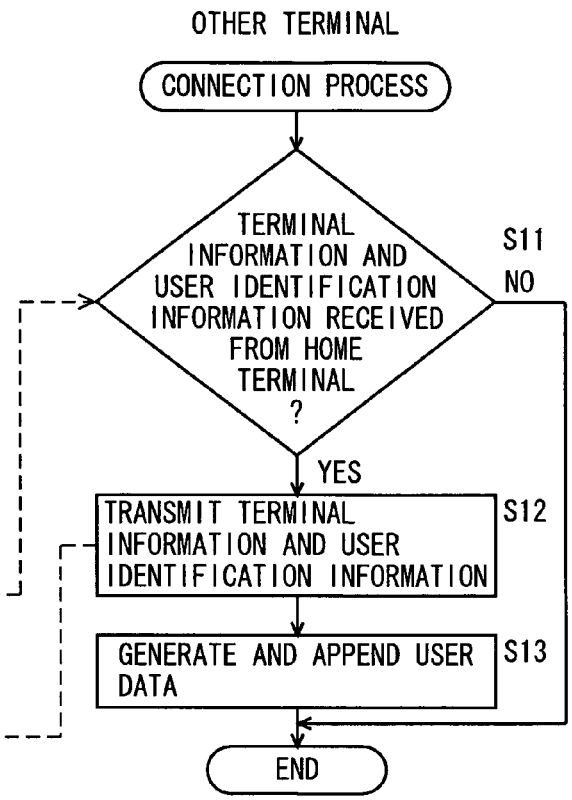

FIGS. 3A and 3B are flow charts showing a flow of a process executed when MFP 100 is newly connected to a network. FIG. 3A shows a flow of an initial setting process executed in MFP 100, and FIG. 3B shows a flow of connection process executed in each of MFPs 100A, 100B, and 100C when the initial setting process is executed in MFP 100. The initial setting process and the connection process are implemented by having an initial setting program that is stored in flash ROM 108 loaded into RAM 105 and executed by CPU 101 in each of MFPs 100, 100A, 100B, and 100C. An initial setting program and a connection program are a part of the image processing program. Moreover, this embodiment is not limited to the example in which CPU 101 reads these programs from flash ROM 108 and executes them. CPU 101 can read and execute a program stored in ROM 103, or a program read from flash ROM 108 can be stored in an EEPROM (Electrically Erasable/Programmable Read Only Memory) connected to CPU 101 and that program can then be read and executed. Furthermore, by saving an image processing program stored in flash ROM 108 into HDD 107 first, the program can be loaded from HDD 107 into RAM 105 and be executed.

With reference to FIG. 3A, terminal information is registered in MFP 100 (step S01). The terminal information at least includes apparatus identification information for identifying MFP 100. The apparatus identification information is preferably location information assigned to MFP 100 in network 2, and is here an IP (Internet Protocol) address. The terminal information can include information showing the location where MFP 100 is disposed.

Next, registered user information of a user who uses MFP 100 as a home terminal is inputted into MFP 100 (step S02). When a plurality of users uses MFP 100 as a home terminal, registered user information of each of the plurality of users is inputted. The registered user information at least includes user identification information for identifying the user. The user identification information needs only to be unique information such as a user ID including characters or symbols and a name of the user. Here, a user name is used as the user identification information. The registered user information can also include personal information in addition to the user identification information. The personal information is information related to the user, and includes accompanying information, an address book, panel setting information, authentication information, and history information.

The registration of the terminal information in step S01 and the input of the registered user information in step S02 are performed by an operation of operation portion 119 by a user. More specifically, a terminal information input window and a registered user information input window are displayed on display portion 119B, and the user operates input portion 119A and inputs the terminal information and the registered user information according to these windows. Upon completing the input of the respective information, the user instructs on a finish button displayed on display portion 119B with input portion 119A so that the completion of the initial setting is detected in MFP 100. Moreover, the registration of the terminal information in step S01 is normally performed by an administrator of the terminal, while the input of the registered user information in step S02 is normally performed by the user.

Then, it is determined whether the initial setting is completed or not (step S03). If the initial setting is completed, the process proceeds to step S04, and if it is not completed, the process goes back to step S01. In step S04, user identification information included in the registered user information and the terminal information for which initial setting is already performed are transmitted to the terminals in the same group. The same group refers to the set of terminals which form the image processing system. Here, MFPs 100, 100A, 100B, and 100C connected to network 2 are considered to be of the same group. Thus, by transmitting an inquiry by broadcast on network 2, MFP 100 receives the IP addresses of terminals respectively transmitted back from MFPs 100A, 100B, and 100C in response to the inquiry. In this manner, the IP addresses of the terminals that form the same group are obtained. Moreover, by grouping, a plurality of terminals connected to network 2 can be divided into different groups. For instance, MFPs 100 and 100A can form one group, while MFPs 100B and 100C can form another group. Such grouping is set by a user. More specifically, as described above, MFP 100 receives the IP addresses of MFPs 100A, 100B, and 100C connected to network 2 and detects MFPs 100A, 100B, and 100C, and the user designates which of MFPs 100A, 100B, and 100C should be in the same group as MFP 100.

Here, terminal information and user identification information are transmitted to one terminal chosen from MFPs 100A, 100B, and 100C set as the same group. An example is described in which MFP 100A is selected, and the user identification information included in the registered user information and the terminal information of MFP 100 are transmitted from MFP 100 to MFP 100A.

Now, with reference to FIG. 3B, MFP 100A receives the user identification information and the terminal information of MFP 100 transmitted from MFP 100 (step S11). In response to this reception, MFP 100A transmits to MFP 100 the user identification information of the registered user information and the terminal information stored in HDD 107 of MFP 100A (step S12).

Going back to FIG. 3A, MFP 100 receives the terminal information and the user identification information of MFP 100A transmitted from MFP 100A (step S05). Then, it is determined whether a terminal to which the terminal information and the user identification information have not yet been transmitted exists among the terminals of the same group or not (step S06). If such a terminal exists, that terminal is selected and the process goes back to step S04, but if not, the process proceeds to step S07. Here, since the terminal information and the user identification information are not yet transmitted to MFPs 100B and 100C, either of these two is selected and the process goes back to step S04. Thus, MFP 100 transmits the terminal information and the user identification information of MFP 100 to the terminals of the same group one by one (step S04), and receives from each terminal the terminal information and the user identification information of that terminal (step S05). Moreover, although, here, the terminals of the same group are selected one by one and the terminal information and the user identification information are transmitted accordingly, the terminal information and the user identification information can be transmitted by broadcast, and the terminal information and the user identification information stored in MFPs 100A, 100B, and 100C can be received from MFPs 100A, 100B, and 100C, respectively.

In step S09, user data is generated from the terminal information and the user identification information received from all of the terminals MFPs 100A, 100B, and 100C of the same group. The user data includes the terminal information and the user identification information. The generated user data is all of the terminal information and the user identification information of MFPs 100, 100A, 100B, and 100C put together. Then, the generated user data is stored in HDD 107.

With reference to FIG. 3B, each of MFPs 100A, 100B, and 100C receives the terminal information and the user identification information of MFP 100 transmitted from MFP 100 (step S11). In response to this reception, MFPs 100A, 100B, and 100C transmit the terminal information and the user identification information of the registered user information of MFPs 100A, 100B, and 100C, respectively, to MFP 100 (step S12). Thus, the connection process is a process executed on the condition that a request is received from MFP 100 which executes the initial setting process. Here, the request is the transmission of the terminal information and the user identification information; however, the request is not limited to this transmission, and it can also be a connection request or the like from MFP 100 that executes the initial setting process.

In the next step, S13, user data is generated from the terminal information and the user identification information of MFP 100 received in step S11, and the generated user data is appended to the user data already stored in HDD 107. Thus, the stored user data in all of MFPs 100, 100A, 100B, and 100C become identical.

Moreover, here, while the registration of the terminal information and the input of the registered user information are performed in the initial setting process executed in MFP 100, a process similar to this initial setting process is executed in the case where MFP 100 is already connected to network 2 and a user is to be added. In such a case, however, the registration process of the terminal information of step S01 is not required.

In addition, the initial setting process can be performed not only when MFPs 100, 100A, 100B, and 100C are connected to network 2 but also after the power is turned on for MFPs 100, 100A, 100B, and 100C, or at prescribed time intervals. It is performed, for instance, to allow MFP 100 to obtain the registered user information of a user newly registered in other MFPs 100A, 100B, and 100C and to store the latest user data. In this case, instead of the process of steps S01 to S03 of the initial setting process shown in FIG. 3A, a request for transmission of the registered user information is made to other MFPs 100A, 100B, and 100C. This transmission request for the registered user information at least includes apparatus identification information. In response to this transmission request, other MFPs 100A, 100B, and 100C execute the connection process shown in FIG. 3B, and in step S11 in response to the transmission request received, transmit the registered user information stored in their respective HDDs 107 to MFP 100 that transmitted the transmission request. Thus, even when the registered user information stored in HDDs 107 of other MFPs 100A, 100B, and 100C is altered, user data will be generated from the altered registered user information and stored in HDD 107. Moreover, there is no need to execute step S13 in the connection process.

FIGS. 4A to 4E are diagrams for describing registered user information and user data. FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C. Moreover, FIG. 4E is a diagram showing an example of user data.

With reference to FIGS. 4A to 4D, the registered user information includes a number, user identification information, and personal information. The personal information includes accompanying information, an address book, panel setting information, authentication information, and history information. The accompanying information is the information unique to a user, such as the name of the division the user belongs to, an electronic mail address assigned to that user, face image data obtained by capturing the face of that user, and so on. The address book is information of all the information of destinations to which transmission can be made put together that is registered by the user, and includes, for instance, the user identification information, an electronic mail address, a facsimile number, and the like of the user at the destination of a transmission. The panel setting information is window setting information customized by the user himself. The authentication information is the information used for authentication of the user at log-in, and here, a password is used. It is also possible to use the face image data as the authentication information. When biometrics authentication is used, a fingerprint, sound spectrogram, iris, vein pattern, and the like are used as the authentication information. The history information is data generated in MFPs 100, 100A, 100B, and 100C when the user instructs MFPs 100, 100A, 100B, and 100C to execute a process, and includes the content of the instruction. If it is an instruction for an electronic mail transmission process, for instance, the content of the instruction includes an indication that it is an electronic mail transmission, the transmission destination, and the content of the transmission. With reference to FIG. 4E, the user data includes a number, user identification information, and apparatus identification information of a home terminal.

In this manner, when an initial setting process is executed in MFP 100, the same user data is generated and stored in MFPs 100, 100A, 100B, and 100C set to be of the same group. Thus, image processing system 1 constructed by MFPs 100, 100A, 100B, and 100C is formed. When image processing system 1 is formed, the user who uses any of MFPs 100, 100A, 100B, and 100C as a home terminal can be specified based on the user data so that, when the user operates a terminal other than a home terminal, the personal information stored in the home terminal can be taken into that terminal using the user data.

The user performs a log-in operation in order to operate one of MFPs 100, 100A, 100B, and 100C. The log-in operation is, more specifically, inputting user identification information. Hereinafter, MFPs 100, 100A, 100B, and 100C at which the user performs the log-in operation are referred to as operation terminals. Here, to simplify the description, the case in which the user of the user identification information "Julie" performs a log-in operation at MFP 100 will be described. In this case, MFP 100 is an operation terminal, and MFP 100A is a home terminal.

Figure 5A:
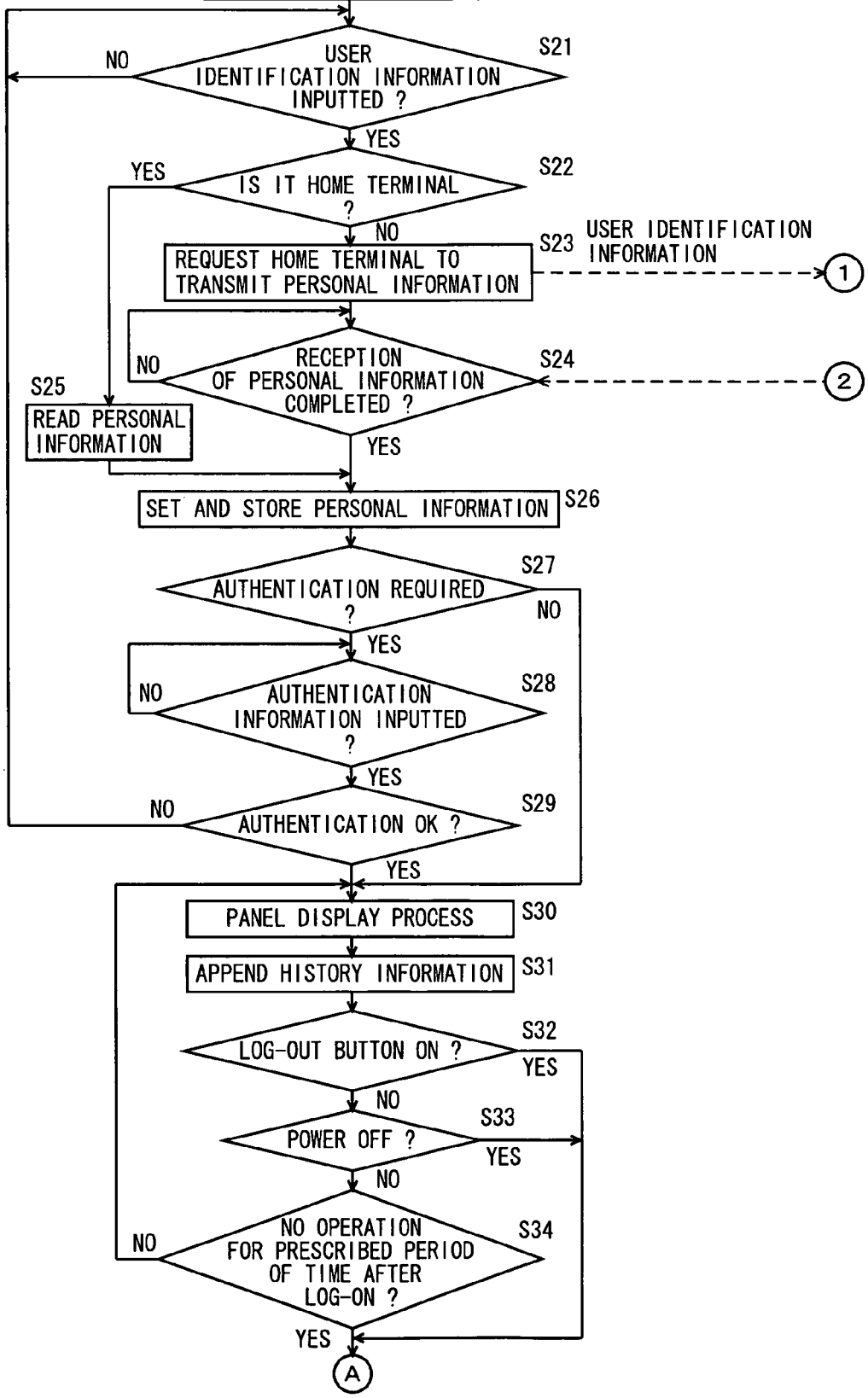
FIGS. 5A to 5C are flow charts showing a flow of a process executed in the image processing system according to the first embodiment.
Figure 5B:
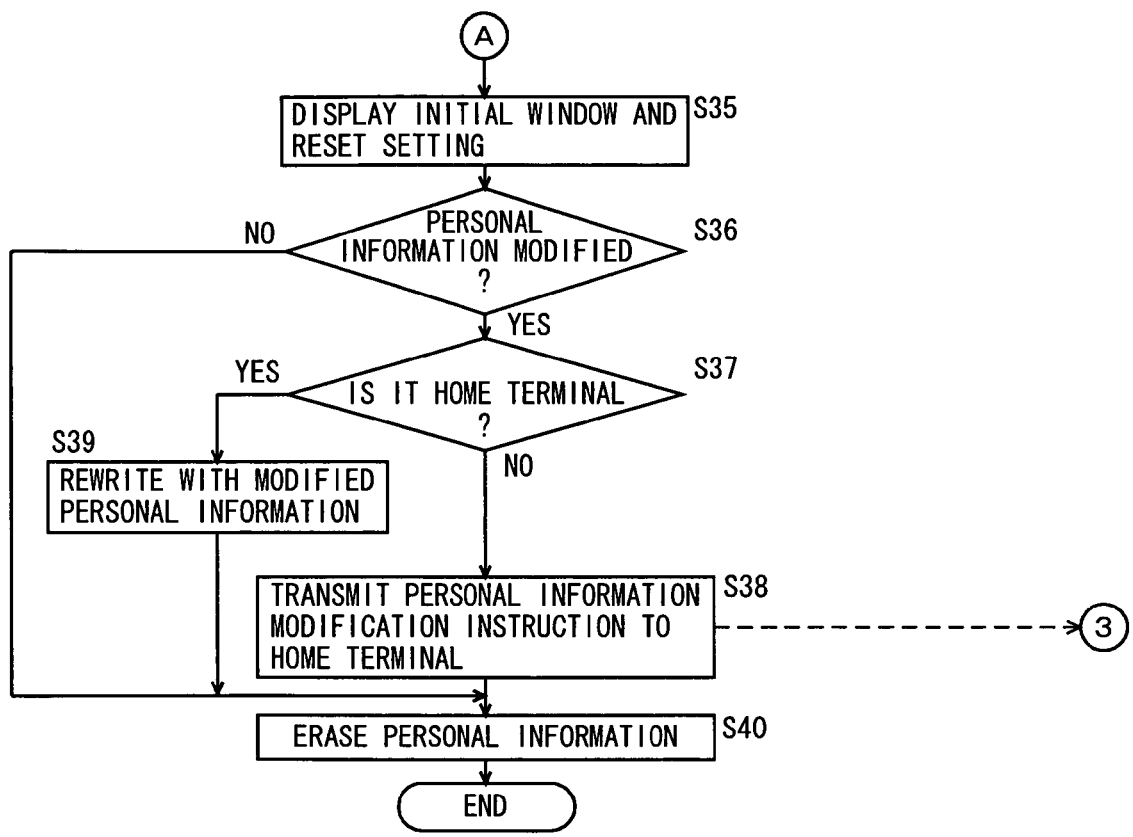
Figure 5C:
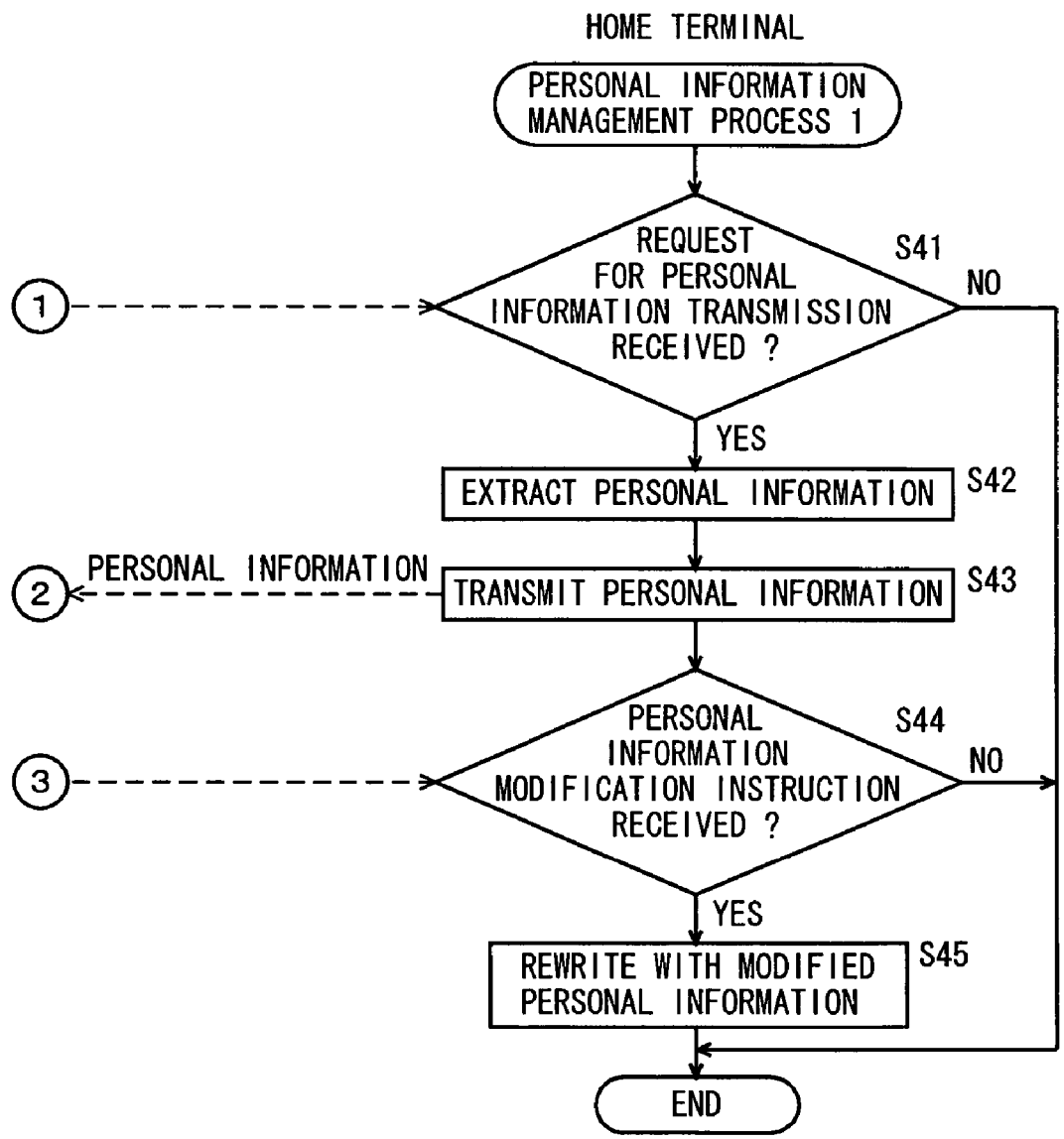

FIGS. 5A to 5C are flow charts showing a flow of a process executed in the image processing system according to the first embodiment. FIGS. 5A and 5B show a flow of an operation input process, and FIG. 5C shows a flow of a personal information management process. The operation input process is a process executed by an operation terminal, and the personal information management process is a process executed by a home terminal. These processes are implemented by having the programs which are stored in flash ROM 108 loaded into RAM 105 of MFP 100, 100A, 100B, or 100C and executed by CPU 101. Moreover, these programs are a part of an image processing program.

With reference to FIGS. 5A to 5C, MFP 100 which is the operation terminal accepts an input of user identification information of the user of the user identification information "Julie" (step S21). If the user identification information is inputted, the process proceeds to step S22, and if not, the process stands by. Thus, the operation terminal executes the process of step S02 and beyond on the condition that the user identification information is inputted. In step S22, it is determined from the inputted user identification information whether the operation terminal is a home terminal of that user or not. In other words, the user data stored in HDD 107 is searched using the user identification information, and it is determined whether the apparatus identification information stored in relation to the user identification information is the apparatus identification information assigned to the operation terminal itself or not. If the operation terminal is a home terminal of the user, the process proceeds to step S25, and if not, it proceeds to step S23. Here, MFP 100 is not a home terminal of the user of the user identification information "Julie" so that the process proceeds to step S23.

In step S23, a transmission of personal information is requested to the home terminal of the user of the user identification information "Julie." This transmission request at least includes the user identification information. Therefore, the user identification information is transmitted using apparatus identification information of a home terminal, or here, using an IP address of MFP 100A.

On the other hand, in MFP 100A which is a home terminal, it is determined whether the request for transmission of personal information is received or not (step S41), and if the transmission request is received, the process proceeds to step S42, but if not, the process is ended. In step S42, using the user identification information included in the transmission request received, registered user information stored in HDD 107 is searched and the personal information stored in association with that user identification information is extracted. Then, the extracted personal information is transmitted to the operation terminal from which the transmission request was transmitted (step S43).

In the operation terminal, according to the transmission request for the personal information transmitted in step S23, the process stands by until the personal information is received (NO in step S24), and if the personal information is received, the process proceeds to step S26 (YES in step S24).

On the other hand, in step S25, registered user information stored in HDD 107 of MFP 100 is searched, and the personal information stored in relation to the user identification information inputted in step S21 is read. Thereafter, the process proceeds to step S26. In step S26, the personal information read in step S25 or the personal information received in step S24 is set for the log-in user and stored in RAM 105.

Next, it is determined whether user authentication is required or not (step S27). Whether or not the user authentication is required can be set in advance in MFPs 100, 100A, 100B, and 100C. Normally, it is set such that the user authentication is required. When the user authentication is required, the process proceeds to step S28, and if not, the process proceeds to step S30.

In step S28, the user is prompted to input authentication information by a window display or by an audio output, and the process stands by until the authentication information is inputted (NO in step S28). When the authentication information is inputted, the process proceeds to step S29. In step S29, the authentication information inputted in step S28 is compared with the authentication information of the personal information stored in RAM 105, and when they match, the execution of the following process is permitted as authentication OK, but if they do not match, the process goes back to step S21.

Moreover, the process of step S29 can be executed at a home terminal. In this case, in step S21, the authentication information is inputted in addition to the input of the user identification information, and in step S23, the transmission request is transmitted with the authentication information inputted in step S21 included therein. In MFP 100A which is a home terminal, in step S42, the authentication information of the personal information extracted and the authentication information included in the transmission request are compared, and it is determined whether the authentication is OK-ed or not. Then, in step S43, the result of this determination is transmitted to the operation terminal.

In step S30, a panel display process is executed based on the personal information set in step S26. The personal information set in step S26 is the personal information of the log-in user. When the panel display process is executed, a window customized according to the panel setting information of the personal information is displayed in display portion 119B. In the panel display process, while the window to be displayed is displayed according to the panel setting information, this panel setting information is switched to the panel setting information of the personal information and displayed. For instance, in the case of a copy setting window, the copy setting window displayed according to copy setting information in the default panel setting information is switched to the copy setting window displayed according to the copy setting information included in the panel setting information of the personal information. Copy setting information is, for instance, information such as magnification "equal magnification," number of copies "two," and sorting "effective." At this time, there is a case where MFP 100, the operation terminal, does not have a function which MFP 100A, the home terminal, has, for instance, as in the case where a sorter is attached to MFP 100A but not to MFP 100. Thus, even when the copy setting window displays sorting as "effective," MFP 100 does not have a sorting function so that the copy setting window becomes inconsistent with the functions that are executable by MFP 100. Therefore, in the copy setting window, of the information included in the panel setting information, the functions which cannot be implemented by the operation terminal is displayed in a different manner from the display of other executable functions so as to indicate that its instruction cannot be accepted. The manner of display to indicate that the acceptance of the instruction is impossible involves, for instance, lowering the darkness of the display related to the sorting in comparison to the display of other executable functions.

In addition to the display of the copy setting window, the panel display process includes a display of an address book displayed upon designation of a destination of transmission (another MFP user, a facsimile, an electronic mail, a network printer, a file server, a groupware server). In the panel display process, when a destination designation is made, an address book of the personal information stored in RAM 105 in step S26 is read and displayed on display portion 119B.

It is also possible to modify the content of the setting of the display of the copy setting window. In this case, the panel setting information of the personal information will be modified. In addition, by the panel display process, the address book can be modified. This involves, for instance, an addition of a new destination, and modification or deletion of an existing destination. By modifying the address book, the address book of the personal information will also be modified.

When a function of MFP 100 which is the operation terminal is executed by the panel display process, history information is generated based on the result of the execution. This history information is appended to the personal information stored in RAM 105 (step S31).

In the following steps, step S32 to S34, it is determined whether an instruction of a log-out is given or not. If there is a log-out instruction, the process proceeds to step S35, and if not, the process goes back to step S30. Thus, until the log-out instruction is given, the panel display process based on the instruction by the log-in user "Julie" is executed repeatedly. The log-out instruction is one of the following cases: where (1) a log-out button of input portion 119A is pressed; where (2) an instruction to turn off the power of MFP 100 which is the operation terminal is inputted; and where (3) after the log-on, an input of operation into input portion 119A is not provided for a prescribed period of time. Thus, in step S32, the process proceeds to step S35 when the log-out button is pressed, and if not, the process proceeds to step S33. In step S33, the process proceeds to step S35 when an instruction to turn off the power is inputted, and if not, the process proceeds to step S34. In step S34, the process proceeds to step S35 when an input of operation is not provided for a prescribed period of time after the log-on, and if this is not the case, the process goes back to S30.

Then, after a log-out process is executed in step S35, the process is ended. Moreover, when the instruction to turn off the power is inputted, MFP 100 which is the operation terminal does not immediately disconnect the power, but disconnects the power only after the following steps of S35 to S40 are completed and the process of disconnecting the power is completed.

In step S35, the window to be displayed on display portion 119B is set to an initial window, and all parameters set in MFP 100 (including panel setting information) are set to the initial values. Then, in step S36, it is determined whether the personal information stored in RAM 105 has been modified by the panel display process in step S30 or not. When it has been modified, the process proceeds to step S37, and if it has not been modified, the process proceeds to step S40.

In step S37, it is determined whether the operation terminal is a home terminal of the log-in user or not, and when it is a home terminal, the process proceeds to step S38, and if not, the process proceeds to step S39. In step S38, an instruction to modify personal information is transmitted to the home terminal. This modification instruction includes user identification information "Julie" of the user who had logged in earlier and the modified personal information. On the other hand, in step S39, the personal information of the registered user information stored in HDD 107 is rewritten with the modified personal information stored in RAM 105. Then, in step S40, the personal information stored in RAM 105 is erased. Thus, the personal information of the user who had logged in earlier is never used for a user who logs in next.

On the other hand, in MFP 100A which is a home terminal, it is determined whether a modification instruction to modify the personal information is received or not (step S44), and if a transmission request is received, the process proceeds to step S45, and if not, the process is ended. In step S45, the registered user information stored in HDD 107 is rewritten using the personal information and the user identification information included in the modification instruction received. More specifically, of the registered user information stored in HDD 107, the personal information of the registered user information which includes the user identification information included in the modification instruction is rewritten with the personal information included in the modification instruction.

Thus, the modification of personal information performed at MFP 100 which is the operation terminal can be reflected on the registered user information stored in MFP 100A which is a home terminal. Thus, regardless of which of MFPs 100, 100A, 100B, and 100C the next log-in takes place at, the panel display process will be executed based on the modified personal information.

Moreover, although the personal information is erased from RAM 105 at the operation terminal in step S40, the personal information can be stored temporarily in HDD 107 and the temporarily stored personal information can be read when the same user logs in again. The personal information stored temporarily in HDD 107 need only to be erased after a prescribed period of time has passed. Thus, the personal information will not be left being stored in an operation terminal other than that serving as a home terminal.

[Modification]

In the above-described image processing system 1, the user data shown in FIG. 4E is generated by executing the initial setting process and the connection process shown in FIGS. 3A and 3B. According to the modification, personal information is received along with user identification information from a home terminal so as to generate and store another user data.

Figure 6A:
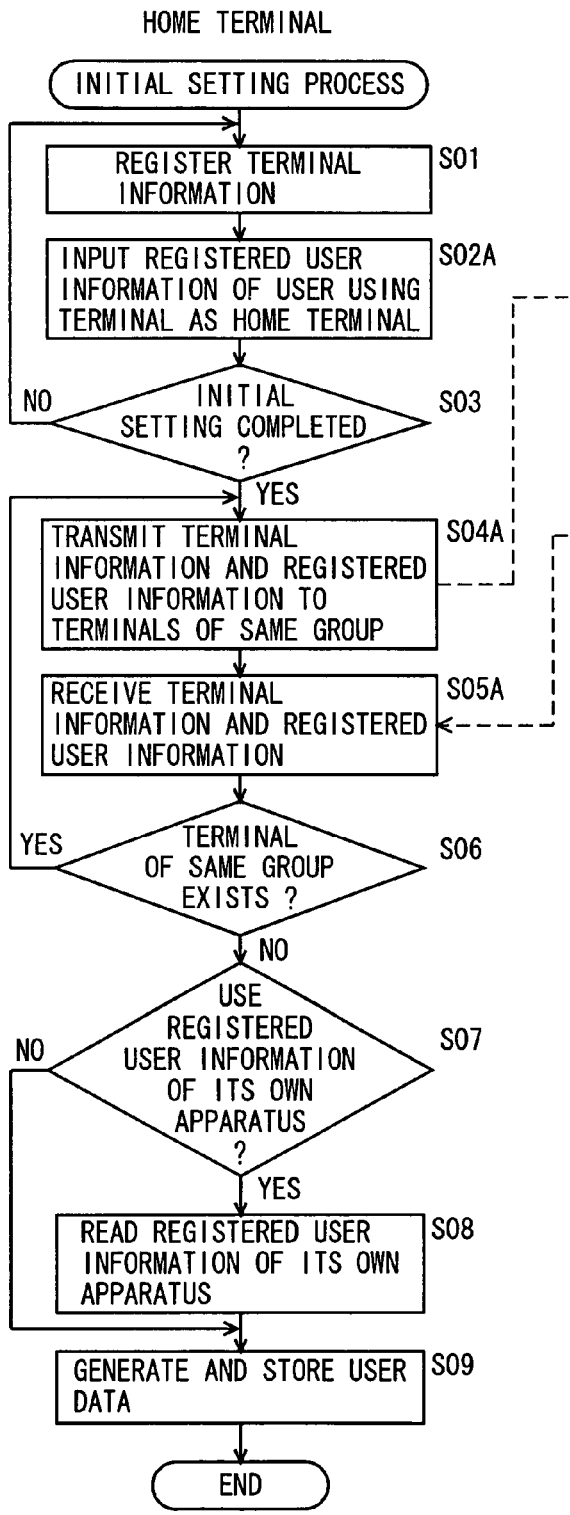
FIGS. 6A and 6B are flow charts showing another flow of a process executed when an MFP 100 is newly connected to the network.
Figure 6B:
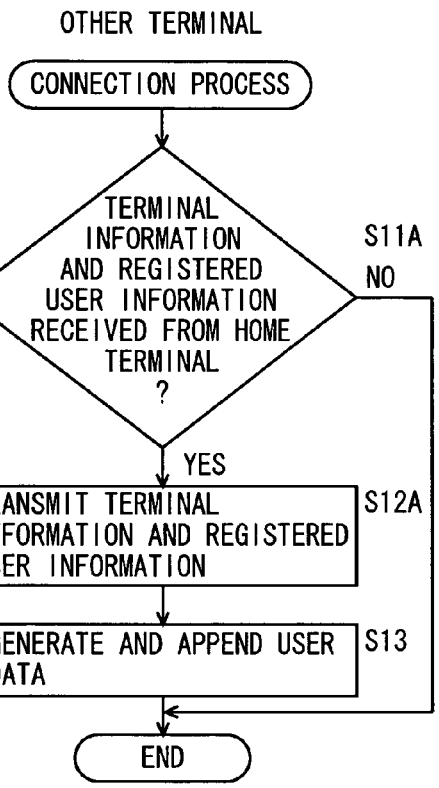

FIGS. 6A and 6B are flow charts showing another flow of a process executed when MFP 100 is newly connected to the network. FIG. 6A shows another flow of an initial setting process executed in MFP 100, and FIG. 6B shows another flow of a connection process executed in each of MFPs 100A, 100B, and 100C when the initial setting process is executed in MFP 100.

With reference to FIG. 6A, the initial setting process shown here differs from that shown in FIG. 3A in that registered user information including personal information in addition to user identification information is transmitted in step S04A, and that the registered user information including the personal information in addition to the user identification information is received in step S05A. In addition, with reference to FIG. 6B, FIG. 6B differs from FIG. 3B in that the registered user information including the personal information in addition to the user identification information is received in step S11A, and that the registered user information including the personal information in addition to the user identification information is transmitted in step S12A.

FIG. 7 is a diagram showing an example of user data generated in each image processing apparatus of the image processing system according to the modification. With reference to FIG. 7, the user data includes user identification information, apparatus identification information for identifying a home terminal of the user identified by the user identification information, and personal information.

Thus, in the image processing system according to the modification, the user data that includes the registered user information stored in other MFPs 100A, 100B, and 100C is generated at the point that MFP 100 is connected anew to the network so that there is no need to obtain the personal information of a user after the user has logged in.

Figure 8A:
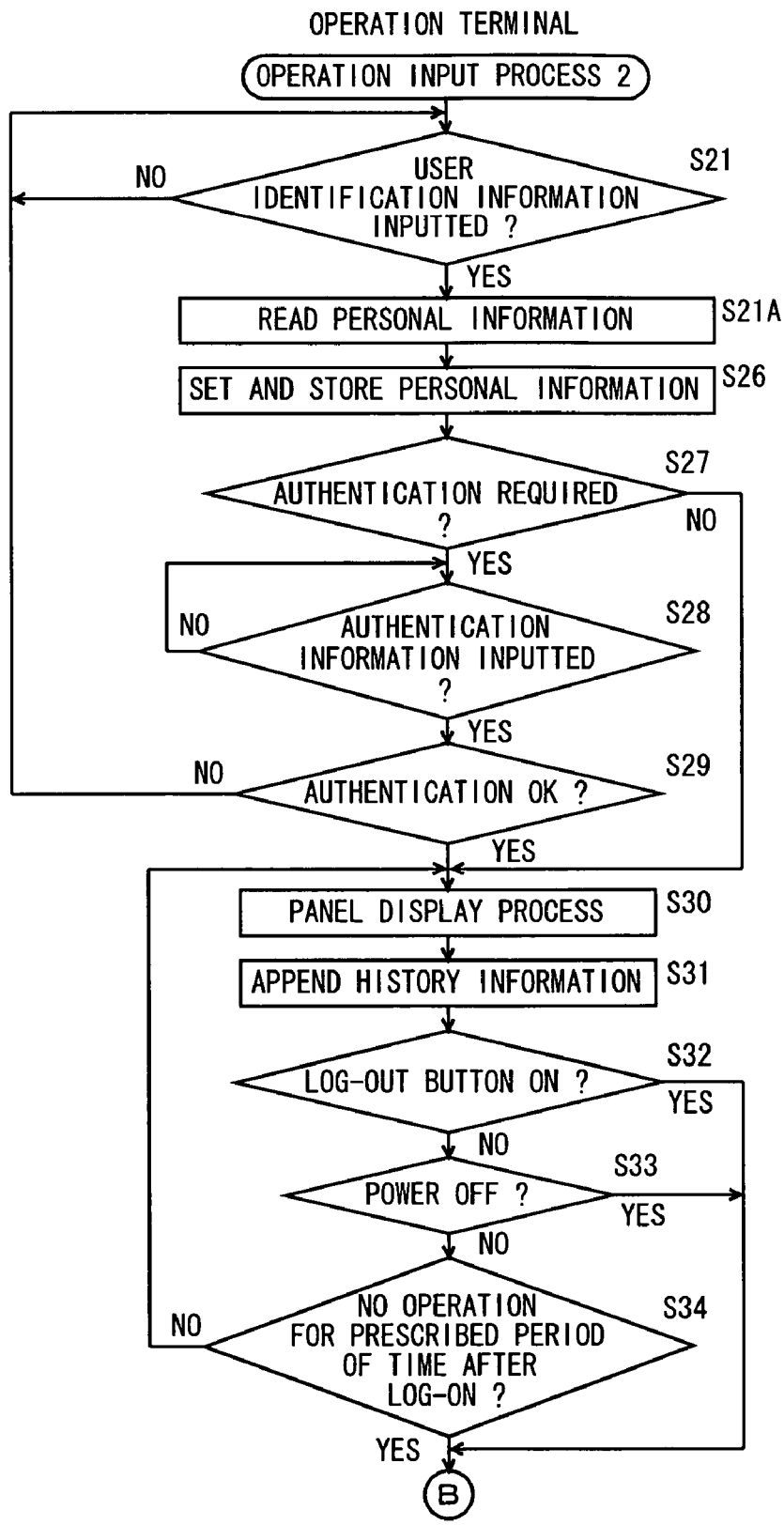
FIGS. 8A to 8C are flow charts showing a flow of a process executed in the image processing system according to the modification.
Figure 8B:
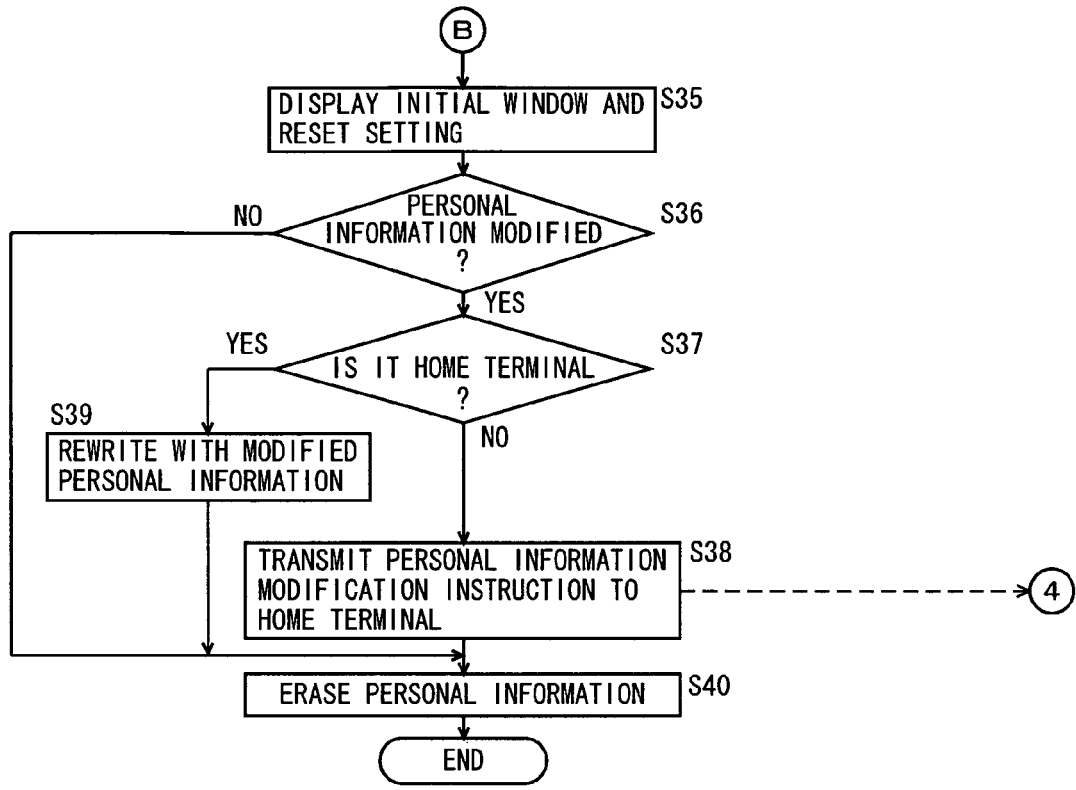
Figure 8C:
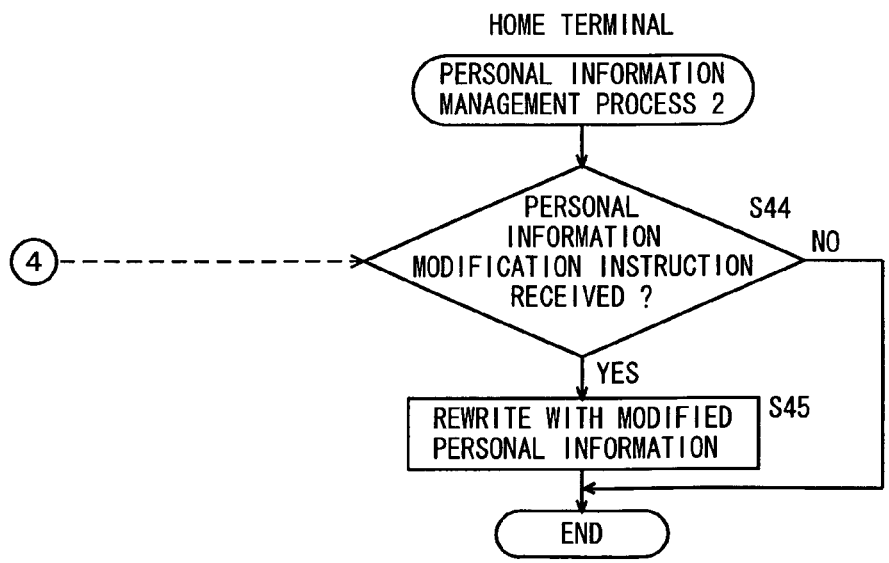

FIGS. 8A to 8C are flow charts showing a flow of a process executed in the image processing system according to the modification. FIGS. 8A and 8B show a flow of an operation input process according to the modification, and FIG. 8C shows a flow of a personal information management process according to the modification. The operation input process is a process executed by an operation terminal, and the personal information management process is a process executed by a home terminal.

With reference to FIGS. 8A and 8B, the operation input process here differs from that shown in FIGS. 5A and 5B in that the process of steps S22 to S25 in the operation input process is not executed, and after step S21, step S21A is executed, and thereafter, the process of step S26 and beyond is executed. Other steps of the process are the same as those of the operation input process shown in FIGS. 5A and 5B so that the description will not be repeated here. In step S21A, using the user identification information inputted in step S21, user data stored in HDD 107 of MFP 100 is searched, and the personal information stored in relation to the user identification information inputted in step S21 is read. Thus, in the operation input process according to the modification, by the execution of the initial setting process, the user data including the personal information is stored in HDD 107 so that there is no need to obtain the personal information of the log-in user anew from a home terminal.

With reference to FIG. 8C, the personal information management process here differs from that shown in FIG. 5C in that the process of steps S41 to S43 is not executed. Other steps of the process are the same as those of the personal information management process shown in FIG. 5C so that the description will not be repeated here.

As described above, image processing system 1 according to the first embodiment is constructed by MFPs 100, 100A, 100B, and 100C connected to network 2. Each of MFPs 100, 100A, 100B, and 100C stores in HDD 107 registered user information that associates user identification information for identifying each of a plurality of users with personal information related to each user. In each of MFPs 100, 100A, 100B, and 100C, an image processing program is executed by CPU 101. When any one of MFPs 100, 100A, 100B, and 100C, for instance, MFP 100, is connected anew to network 2, MFP 100 executes an initial setting process and transmits a user identification information transmission request to request a transmission of user identification information stored in HDDs 107 provided in other MFPs 100A, 100B, and 100C. In response to the reception of the user identification information transmission request from MFP 100, each of MFPs 100A, 100B, and 100C transmits the user identification information stored in HDD 107 to MFP 100 that transmitted the user identification information transmission request. Then, if MFP 100 receives the user identification information transmitted in response to the user identification information transmission request, MFP 100 stores the user data that associates the received user identification information with the IP address of one of MFPs 100A, 100B, and 100C which stored the user identification information. Thus, in each of MFPs 100, 100A, 100B, and 100C, the user data is stored that associates the user identification information with the apparatus identification information for identifying each of MFPs 100, 100A, 100B, and 100C which stored the user identification information so that the apparatus identification information associated with the user identification information can be specified by the user data.

In addition, when user identification information, for instance "Julie," is inputted, an operation terminal, for instance MFP 100, obtains the personal information associated with that user identification information from MFP 100A which is the home terminal that is determined by the user identification information and the user data, and executes a panel display process based on that personal information.

Moreover, with image processing system 1 according to the modification, when any one of MFPs 100, 100A, 100B, and 100C, for instance MFP 100, is connected anew to network 2, MFP 100 executes an initial setting process and transmits a registered user information transmission request to request a transmission of registered user information stored in HDDs 107 provided in other MFPs 100A, 100B, and 100C. In response to the reception of the registered user information transmission request from MFP 100, each of MFPs 100A, 100B, and 100C transmits the registered user information stored in HDD 107 to MFP 100 that transmitted the registered user information transmission request. Then, if MFP 100 receives the registered user information transmitted in response to the registered user information transmission request, MFP 100 stores the user data that associates the received registered user information with the IP address of one of MFPs 100A, 100B, and 100C which stored the user identification information included in the registered user information. Thus, in each of MFPs 100, 100A, 100B, and 100C, the user data is stored that associates the registered user information with the apparatus identification information for identifying each of MFPs 100, 100A, 100B, and 100C which stored the user identification information so that the personal information associated with the user identification information by the user data can be obtained.

Second Embodiment

An overall arrangement of an image processing system according to the second embodiment is similar to the image processing system according to the first embodiment shown in FIG. 1. Moreover, the hardware arrangement of MFPs 100, 100A, 100B, and 100C forming the image processing system according to the second embodiment is the same as that of MFP 100 shown in FIG. 2. Thus, the description thereof will not be repeated here. In the first embodiment, user data is stored in each of MFPs 100, 100A, 100B, and 100C which form image processing system 1. In an image processing system 1A according to the second embodiment, however, user data is not stored in MFPs 100, 100A, 100B, and 100C. Thus, the initial setting process and the connection process shown in FIGS. 3A and 3B are not executed. When MFP 100 is connected anew to network 2, the process required for establishing connection to network 2 (for instance, setting of an IP address) is performed and registered user information is stored.

Figure 9A:
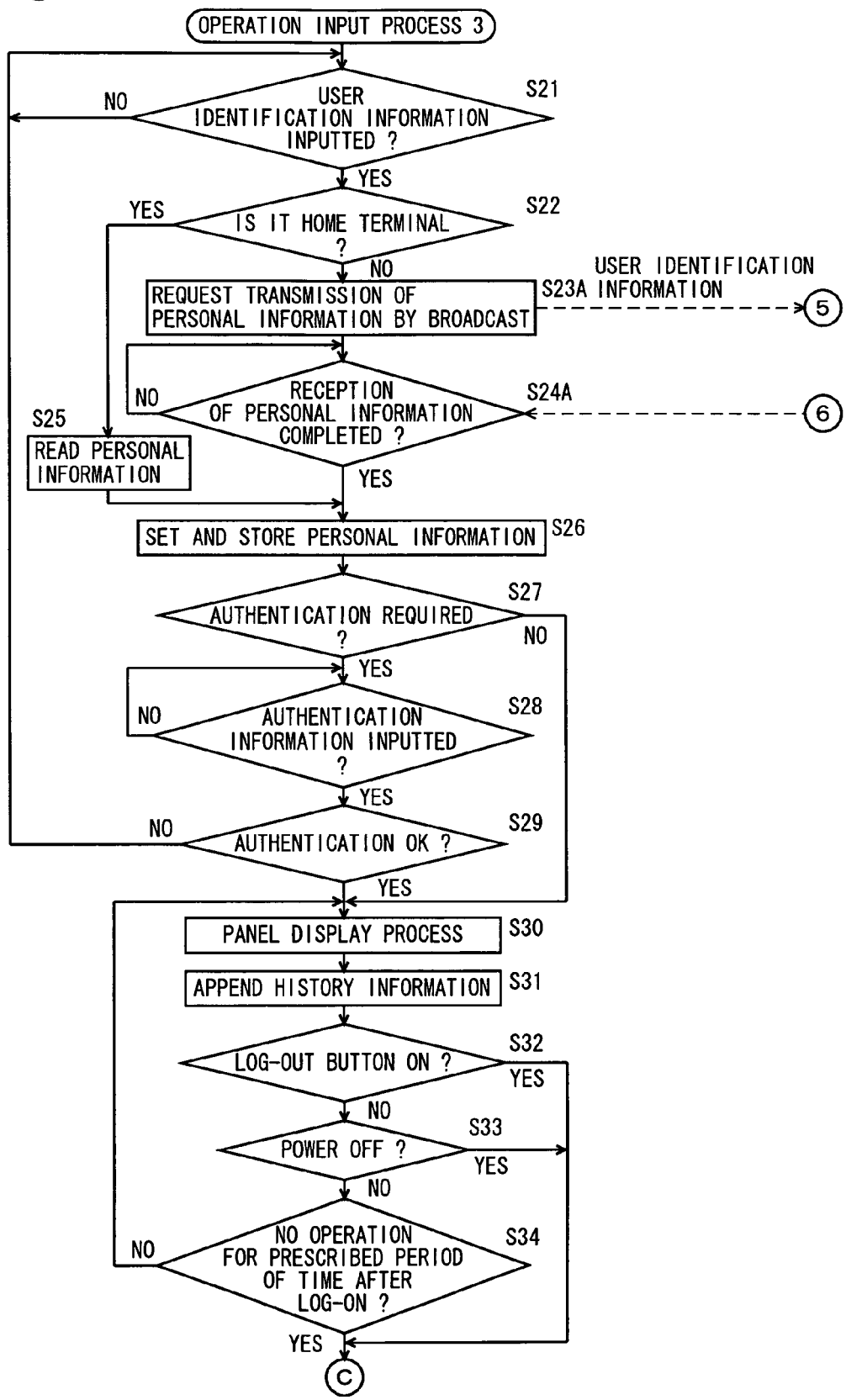
FIGS. 9A to 9C are flow charts showing a flow of a process executed in an image processing system according to a second embodiment.
Figure 9B:
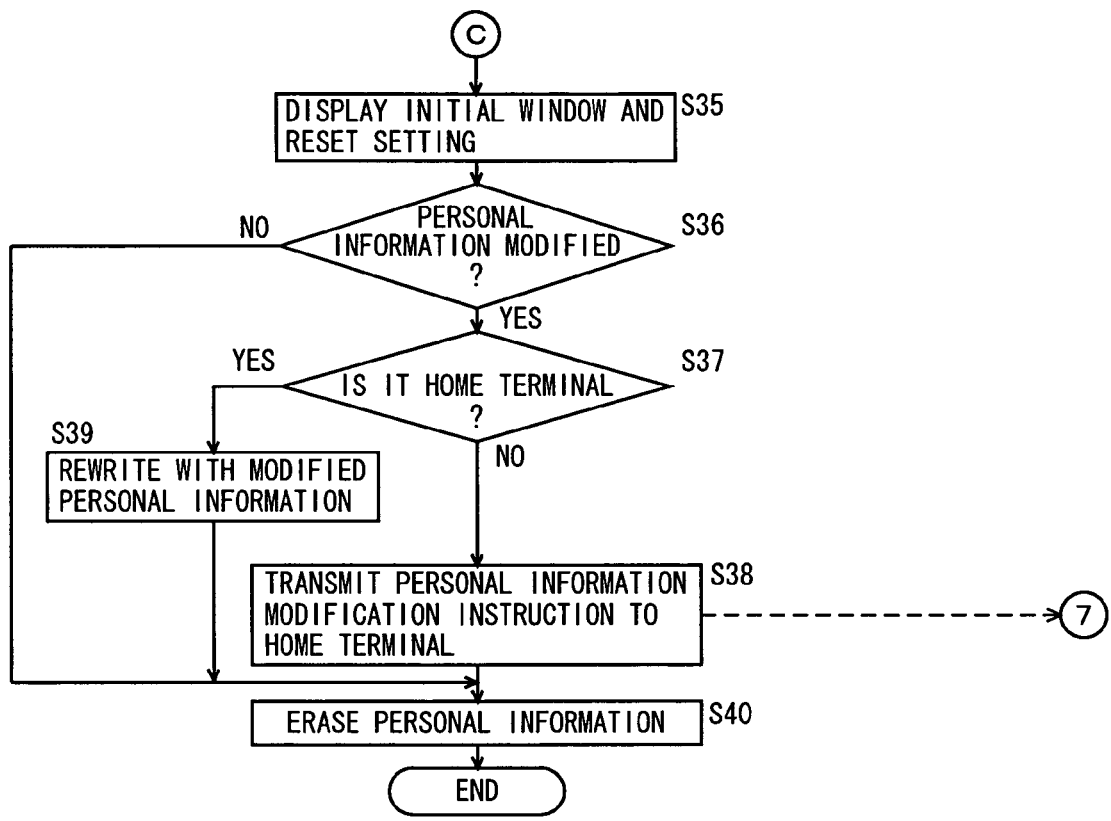
Figure 9C:
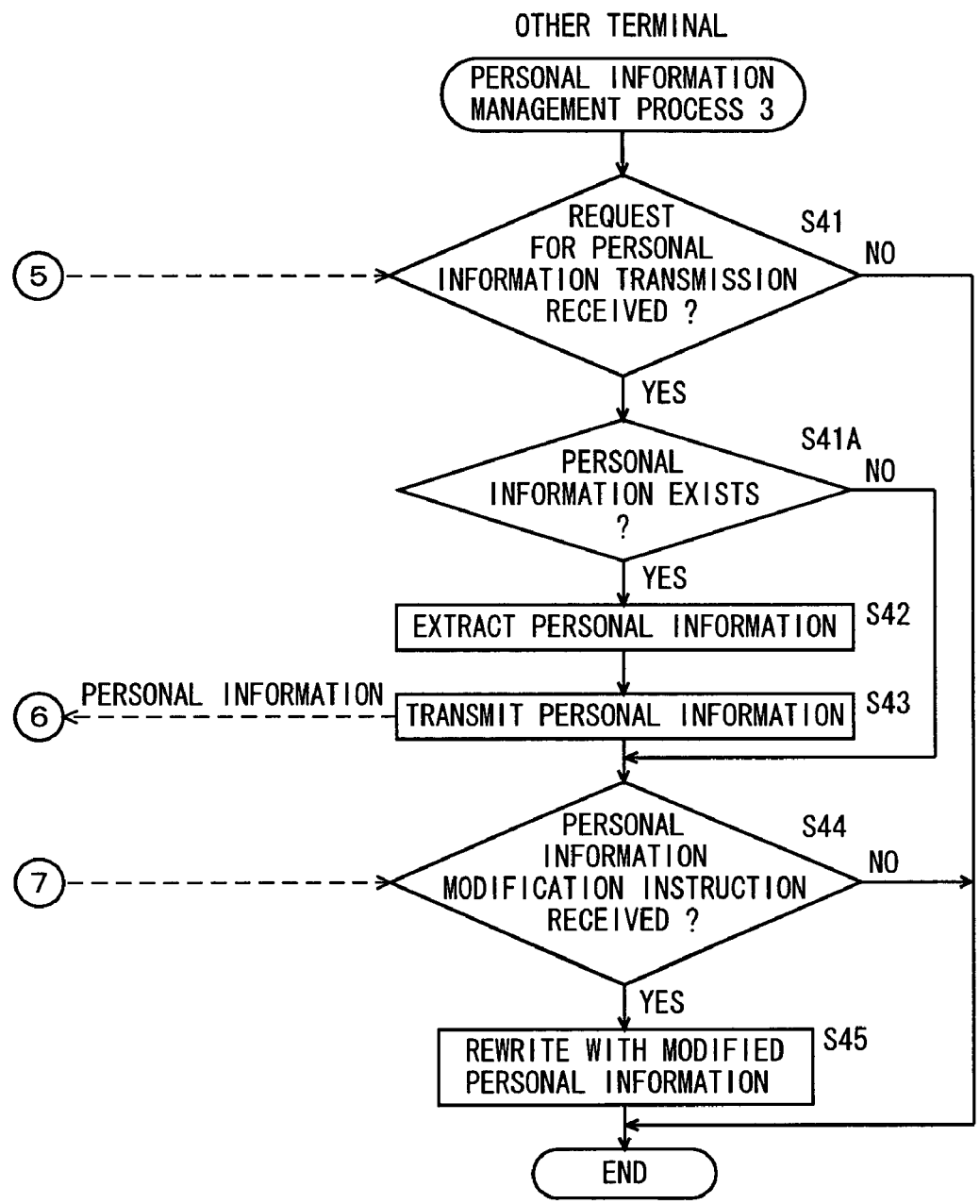

Thus, in MFPs 100, 100A, 100B, and 100C according to the second embodiment, in order to obtain the personal information of the log-in user from a home terminal, a request for a transmission of the personal information is transmitted by broadcast on network 2. FIGS. 9A to 9C are flow charts showing a flow of a process executed in the image processing system according to the second embodiment. FIGS. 9A and 9B show a flow of an operation input process according to the second embodiment, and FIG. 9C shows a flow of a personal information management process according to the second embodiment. The operation input process is a process executed by an operation terminal, and the personal information management process is a process executed by a terminal other than the operation terminal.

With reference to FIGS. 9A and 9B, the operation input process here differs from that according to the first embodiment shown in FIGS. 5A and 5B in that steps S23A and S24A are executed in place of steps S23 and S24. Other steps of the process are the same as those of the operation input process shown in FIGS. 5A and 5B so that the description will not be repeated here. Moreover, with reference to FIG. 9C, the personal information management process here differs from that shown in FIG. 5C in that step S41A is added after step S41. Other steps of the process are the same as those of the personal information management process shown in FIG. 5C so that the description will not be repeated here.

In step S23A, a transmission request to request a transmission of personal information is outputted by broadcast on network 2. This transmission request at least includes user identification information. Therefore, the user identification information will be transmitted by broadcast. Thus, the transmission request will be received in all of MFPs 100A, 100B, and 100C but not in MFP 100 which is the operation terminal. Then, the process stands by until the personal information is received according to the transmission request for the personal information transmitted in step S23 (NO in step S24A), and when the personal information is received, the process proceeds to step S26 (YES in step S24A).

On the other hand, at a terminal other than the operation terminal, it is determined whether the transmission request for personal information is received or not (step S41), and if the transmission request is received, the process proceeds to step S41A, but if not, the process is ended. In step S41A, using the user identification information included in the transmission request received, the registered user information stored in HDD 107 is searched, and it is determined whether the registered user information which includes that user identification information exists or not. If it exists, the process proceeds to step S42, but if it does not exist, the process proceeds to step S44. In the case where the terminal that executes the personal information management process is a home terminal, the process would proceed to step S42, while with a terminal other than the home terminal, the process would proceed to step S44. In step S42, personal information stored in association with the user identification information is extracted. Then, the extracted personal information is transmitted to the operation terminal which transmitted the transmission request (step S43).

As described above, in image processing system 1A according to the second embodiment, when user identification information is inputted, the operation terminal, for instance MFP 100, determines whether personal information associated with that user identification information is stored in HDD 107 or not, and if it determines that the personal information is stored, it reads the personal information associated with the user identification information from HDD 107, and if it determines that the personal information is not stored, it transmits a personal information transmission request including the user identification information to MFPs 100A, 100B, and 100C and receives the personal information associated with that user identification information from MFPs 100A, 100B, and 100C that store the registered user information including that user identification information. Then, a prescribed apparatus operation is controlled based on the personal information. Thus, by storing the personal information in any one of MFPs 100, 100A, 100B, and 100C connected to network 2, for instance in MFP 100, the user can cause MFPs 100A, 100B, and 100C which do not store that personal information to control the operation based on that personal information.

Moreover, in the image processing system according to the second embodiment, even when a single user uses a plurality of home terminals, the personal information is received at an operation terminal from each of the home terminals. Thus, even in the case where an address book is stored in each of a plurality of terminals MFPs 100, 100A, 100B, and 100C, for instance, those address books can be utilized at the operation terminal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising a plurality of image processing apparatuses each connected to a network, each of said plurality of image processing apparatuses comprising:

a storage portion to store registered user information which associates user identification information for identifying a user with personal information unique to said user;

a user identification information transmission request portion to request at least one other image processing apparatus to transmit user identification information stored in said storage portion provided in said at least one other image processing apparatus;

a user identification information reception portion to receive the user identification information transmitted by said at least one other image processing apparatus according to a user identification information transmission request made by said user identification information transmission request portion;

a user data storage portion to store user data which associates the user identification information received by said user identification information reception portion with apparatus identification information for identifying an image processing apparatus that stored said user identification information;

an input portion into which the user identification information is inputted;

a personal information obtaining portion to obtain, from an image processing apparatus determined by said user identification information and said user data, personal information associated with said user identification information inputted, in response to the user identification information being inputted into said input portion; and a control portion to control a prescribed apparatus operation based on the personal information obtained by said personal information obtaining portion.

2. The image processing system according to claim 1, wherein each of said plurality of image processing apparatuses further comprises an address data storage portion to store address data including a destination of transmission of data for each user, and wherein said personal information includes said address data, and said control portion includes an address data display portion to display address data associated with the user identification information inputted into said input portion.

3. The image processing system according to claim 1, wherein each of said plurality of image processing apparatuses further comprises a history information storage portion to store for each user history information of a process according to an instruction by the user every time said instruction is inputted, and wherein said personal information includes said history information, and said control portion includes a history information update portion to update history information associated with the user identification information inputted into said input portion every time the instruction by the user is inputted.

4. The image processing system according to claim 1, wherein each of said plurality of image processing apparatuses further comprises:

an authentication data storage portion to store authentication data for authenticating a user; and an authentication portion to permit an input of an instruction by said user on a condition that the authentication data stored in said authentication data storage portion is inputted, and wherein said personal information includes said authentication data, and said control portion causes said authentication portion to determine whether or not to permit the input of said instruction according to the authentication data associated with the user identification information inputted into said input portion.

5. The image processing system according to claim 4, wherein each of said plurality of image processing apparatuses further comprises:

a personal information storage portion to store personal information obtained by said personal information obtaining portion; a log-off portion to deny an input of an instruction by a user permitted by said authentication portion; and an erase portion to erase from said personal information storage portion, in response to the input of the instruction being denied by said log-off portion, said personal information received from another image processing apparatus if said personal information is received from said another image processing apparatus.

6. The image processing system according to claim 1, wherein each of said plurality of image processing apparatuses further comprises:

a display portion to display information according to setting data; a setting data storage portion to store said setting data for each user; and a setting switching portion to switch said setting data according to user identification information, and wherein said personal information includes said setting data, and said control portion causes said display portion to display information according to setting data associated with the user identification information inputted into said input portion.

7. The image processing system according to claim 1, wherein each of said plurality of image processing apparatuses, when personal information is modified, updates personal information stored in said storage portion if said personal information is read from said storage portion and causes another image processing apparatus to update said personal information to a modified content if said personal information was received from said another image processing apparatus.

8. An image processing apparatus connected to a network and being capable of communicating with at least one other image processing apparatus connected to said network, comprising:

a storage portion to store registered user information which associates user identification information for identifying a user with personal information related to said user;

a user identification information transmission request portion to request said at least one other image processing apparatus to transmit user identification information stored in said at least one other image processing apparatus;

a user identification information reception portion to receive the user identification information transmitted by said at least one other image processing apparatus according to a user identification information transmission request made by said user identification information transmission request portion;

a user data storage portion to store user data which associates the user identification information received by said user identification information reception portion with apparatus identification information for identifying an image processing apparatus that stored said user identification information;

an input portion into which the user identification information is inputted; a personal information obtaining portion to obtain, from an image processing apparatus determined by said user identification information and said user data, personal information associated with said user identification information inputted, in response to the user identification information being inputted into said input portion; and a control portion to control a prescribed apparatus operation based on the personal information obtained by said personal information obtaining portion.

9. The image processing apparatus according to claim 8, further comprising an address data storage portion to store address data including a destination of transmission of data for each user, and wherein said personal information includes said address data, and said control portion includes an address data display portion to display address data associated with the user identification information inputted into said input portion.

10. The image processing apparatus according to claim 8, further comprising a history information storage portion to store for each user history information of a process according to an instruction by the user every time said instruction is inputted, and wherein said personal information includes said history information, and said control portion includes a history information update portion to update history information associated with the user identification information inputted into said input portion every time the instruction by the user is inputted.

11. The image processing apparatus according to claim 8, further comprising:
an authentication data storage portion to store authentication data for authenticating a user; and
an authentication portion to permit an input of an instruction by said user on a condition that the authentication data stored in said authentication data storage portion is inputted, and wherein said personal information includes said authentication data, and said control portion causes said authentication portion to determine whether or not to permit the input of said instruction according to the authentication data associated with the user identification information inputted into said input portion.

12. The image processing apparatus according to claim 11, further comprising:
a personal information storage portion to store personal information obtained by said personal information obtaining portion; a log-off portion to deny an input of an instruction by a user permitted by said authentication portion; and
an erase portion to erase from said personal information storage portion, in response to the input of the instruction being denied by said log-off portion, said personal information received from another image processing apparatus if said personal information is received from said another image processing apparatus.

13. The image processing apparatus according to claim 8, further comprising:
a display portion to display information according to setting data; a setting data storage portion to store said setting data for each user; and
a setting switching portion to switch said setting data according to user identification information, and wherein said personal information includes said setting data, and said control portion causes said display portion to display information according to setting data associated with the user identification information inputted into said input portion.

14. The image processing apparatus according to claim 8, wherein said image processing apparatus, when personal information is modified, updates personal information stored in said storage portion if said personal information is read from said storage portion and causes another image processing apparatus to update said personal information to a modified content if said personal information was received from said another image processing apparatus.

15. A computer readable medium that stores an image processing program executed by an image processing apparatus which is connected to a network and which is capable of communicating with at least one other image processing apparatus connected to said network, wherein said image processing apparatus includes a storage portion to store registered user information which associates user identification information for identifying a user with personal information related to said user, said image processing program comprising the steps of:
requesting said at least one other image processing apparatus to transmit user identification information stored in said at least one other image processing apparatus;
receiving the user identification information transmitted by said at least one other image processing apparatus according to a user identification information transmission request made in said requesting step;
storing user data which associates the user identification information received in said receiving step with apparatus identification information for identifying an image processing apparatus that stored said user identification information;
accepting an input of the user identification information;
obtaining, from an image processing apparatus determined by said user identification information and said user data, personal information associated with said user identification information inputted, in response to the user identification information being inputted in said accepting step; and
controlling a prescribed apparatus operation based on said personal information obtained.

* * * * *